United States Patent
Simmons et al.

(10) Patent No.: US 6,966,331 B2
(45) Date of Patent: Nov. 22, 2005

(54) VALVE STEM ADAPTOR

(76) Inventors: Jerry C. Simmons, 125 Judith Dr., Venetia, PA (US) 15367; Andrew Snyder, III, 112 Pine Ave., Houston, PA (US) 15342

(*) Notice: Subject to any disclaimer, the term of this patent is extended or adjusted under 35 U.S.C. 154(b) by 284 days.

(21) Appl. No.: 10/411,982

(22) Filed: Apr. 11, 2003

(65) Prior Publication Data

US 2003/0192590 A1     Oct. 16, 2003

Related U.S. Application Data

(60) Provisional application No. 60/372,973, filed on Apr. 16, 2002.

(51) Int. Cl.[7] .............................................. F16K 15/20
(52) U.S. Cl. ........................ 137/232; 137/223; 152/427
(58) Field of Search ................................ 137/223, 232; 152/415, 427, 428, DIG. 11

(56) References Cited

U.S. PATENT DOCUMENTS

| | | | | |
|---|---|---|---|---|
| 549,603 A | * | 11/1895 | Jeffery | 152/427 |
| 565,573 A | * | 8/1896 | Schrader | 137/232 |
| 1,212,641 A | * | 1/1917 | Hilding | 137/232 |
| 2,813,568 A | * | 11/1957 | Kilmarx, Jr. | 152/427 |
| 2,837,134 A | * | 6/1958 | Steer | 152/427 |
| 3,019,832 A | * | 2/1962 | Williams | 152/427 |
| 4,064,923 A | * | 12/1977 | German et al. | 152/427 |
| 5,741,103 A | * | 4/1998 | Lee | 137/223 |
| 6,588,446 B2 | * | 7/2003 | Reinhardt | 137/223 |

* cited by examiner

Primary Examiner—John Rivell
(74) Attorney, Agent, or Firm—The Webb Law Firm; Nathan J. Prepelka

(57) ABSTRACT

A valve stem adaptor is provided for a valve stem assembly having a body with a first end and a second end and having an elongated shaft portion with a first end and a second end and having a passageway extending through the shaft. The shaft second end has external threads displaced thereon, and the body second end has a circular end rim with an end rim groove extending around an end rim perimeter. A fastening mechanism engages an outer surface of a tire rim. The valve stem adaptor includes an adaptor body manufactured from rigid material and has an adaptor rim portion with an upper surface, lower surface and passageway extending through the adaptor body. The valve stem adaptor also includes a first O-ring adapted to fit adjacent an upper surface of the adaptor rim portion, and a second O-ring adapted to fit adjacent a bottom surface of the adaptor rim portion.

20 Claims, 1 Drawing Sheet

VALVE STEM ADAPTOR

CROSS REFERENCE TO RELATED APPLICATIONS

This application claims the benefit of U.S. Provisional Patent Application Ser. No. 60/372,973, filed Apr. 16, 2002.

BACKGROUND OF THE INVENTION

1. Field of the Invention

The present invention relates generally to valve stems and valve stem assemblies for vehicle tires and, in particular, to a valve stem adaptor for use in connection with a valve stem assembly for a tire.

2. Description of Related Art

In order to inflate and deflate tires on vehicles, a valve stem assembly is required, which allows the passage of pressurized air through the assembly into the tire or tube. Commercial and consumer vehicles, such as cars, trucks, buses, etc., require such a valve stem assembly for tire maintenance. While both consumer and commercial vehicles require such assemblies, increased maintenance is required on a commercial valve stem assembly, since commercial vehicles are used much more frequently.

A typical problem on a commercial vehicle is the leakage of air at the base of the valve stem assembly. This problem is amplified when dealing with tubeless heavy truck tire rims. In order to avoid or minimize such leakage, prior art methods have utilized a rubber grommet near the base of the valve stem assembly to assist in forming a seal between the valve stem assembly and the inner wall of the tire rim. However, these grommets and other parts that are manufactured from rubber are particularly subject to wear-and-tear and degradation. When the rubber grommet begins to degrade or otherwise fail, the seal between the valve stem assembly and the inner wall of the tire rim is compromised, which results in air leakage.

When an air leak is detected, the only method of stopping such leakage is by removal of the rim from the truck and the re-tightening of the valve stem assembly and, in particular, further pressing the rubber grommet against the rim to reestablish the seal. If the rubber grommet has become too deformed or degraded, this grommet must then be removed and replaced prior to reinstalling the rim and tire on the vehicle. The removal of a rim from a truck, a re-tightening or replacing of the valve stem assembly, or any part thereof, and the replacement of the rim and tire onto the vehicle is labor intensive.

SUMMARY OF THE INVENTION

Therefore, it is an object of the present invention to provide a valve stem adaptor that overcomes the deficiencies of the prior art. It is another object of the present invention to provide a valve stem assembly that is less prone to leakage of air at the valve stem assembly/rim interface. It is another object of the present invention to provide a valve stem adaptor that is able to withstand torqueing and re-tightening over an extended period of time. It is still another object of the present invention to provide a valve stem adaptor that is easy to install and inexpensive to manufacture.

The present invention is a valve stem adaptor for use in connection with a valve stem assembly of a tire. The valve stem assembly has a body with a body first end and a body second end. The body includes an elongated shaft portion, with a shaft first end and a shaft second end. The shaft has a passageway extending therethrough and the body second end has a circular end rim with an end rim groove extending around the end rim perimeter. The shaft second end has external threads displaced thereon, and the valve stem assembly includes a fastening mechanism for engaging an outer surface of a tire rim.

The valve stem adaptor includes an adaptor body with an adaptor rim portion having an upper groove and a passageway extending through the adaptor body. The adaptor also includes a first O-ring, which fits adjacent an upper surface of the adaptor rim portion, and a second O-ring, which fits adjacent a bottom surface of the adaptor rim portion. The adaptor body is sized and shaped such that it fits over the valve stem shaft, and the second O-ring is adapted to at least partially fit in the end rim groove. The first O-ring seals against an inner surface of the tire rim. Therefore, the end rim groove is sealed against the adaptor rim portion, and the adaptor rim portion is, in turn, sealed against the inner surface of the tire rim. Finally, it is envisioned that the adaptor body is manufactured from rigid material, such as metal, hardened plastic or other non-wearable or minimally wearable material.

The present invention, both as to its construction and its method of operation, together with the additional objects and advantages thereof, will best be understood from the following description of exemplary embodiments when read in connection with the accompanying drawings.

DETAILED DESCRIPTION OF THE PREFERRED EMBODIMENTS

Figure 1:
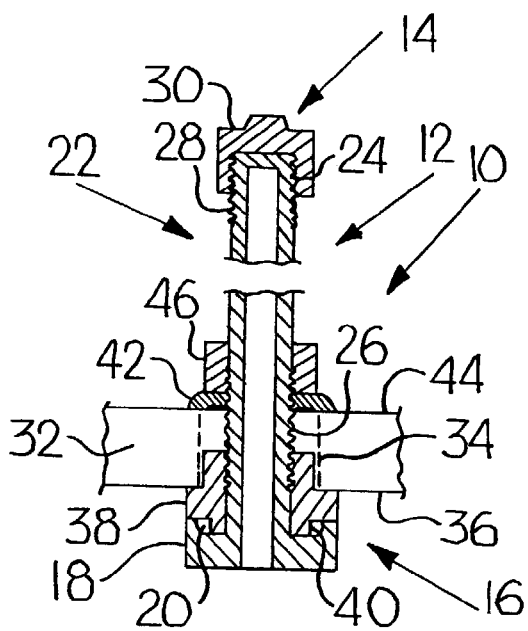
FIG. 1 is a side sectional view of a valve stem assembly according to the prior art.

For purposes of the description hereinafter, the terms "upper", "lower", "right", "left", "vertical", "horizontal", "top", "bottom" and derivatives thereof shall relate to the invention as it is oriented in the drawing figures. However, it is to be understood that the invention may assume various alternative variations and step sequences, except where expressly specified to the contrary. It is also to be understood that the specific devices and processes illustrated in the attached drawings, and described in the following specification, are simply exemplary embodiments of the invention. Hence, specific dimensions and other physical characteristics related to the embodiments disclosed herein are not to be considered as limiting.

FIG. 1 illustrates a valve stem assembly 10 according to the prior art. As seen in FIG. 1, the valve stem assembly 10 includes a valve stem body 12 having a valve stem body first end 14 and a valve stem body second end 16. On the valve stem body second end 16 is a circular end rim 18, and the circular end rim 18 includes a circular end rim groove 20. Connecting the valve stem body first end 14 and the valve stem body second end 16 is an elongated shaft portion 22. A passageway 24 extends through the elongated shaft portion 22, thereby allowing access from the valve stem body first end 14, through the elongated shaft portion 22 to the valve stem body second end 16. Pressurized air is injected through this passageway 24 into the tire (not shown).

Near the valve stem body second end 16, and spaced from the circular end rim 18 is a first set of external threads 26. Although unnecessary, a second set of external threads 28 may be displaced on the valve stem body first end 14. This second set of external threads 28 is used in conjunction with an end cap 30, which is configured to threadedly engage the second set of external threads 28. Importantly, an air valve mechanism (not shown) is housed within the passageway 24, and serves to permit or prevent the passage of pressurized air through the passageway 24.

The valve stem assembly 10 is able to be inserted through a tire rim 32 and, specifically, at least partially inserted through a tire rim orifice 34. In order to assist in providing a seal between the circular end rim 18, the valve stem assembly 10 and a tire rim inner surface 36, a rubber fixture 38 is used. The rubber fixture 38 is capable of being slid over the valve stem body first end 14 and has a rubber fixture bead 40, which seals against the circular end rim groove 20. Therefore, when the valve stem assembly 10 is inserted through the tire rim 32, the rubber fixture 38 seals against the tire rim inner surface 36, and the circular end rim 18 seals against the rubber fixture bead 40. Accordingly, a seal is provided between the valve stem assembly 10 and the tire rim inner surface 36.

In order to complete the seal, a sleeve 42 is included, and this sleeve 42 fits over the valve stem body first end 14, sliding down over the elongated shaft portion 22 and resting against a tire rim outer surface 44. In order to tighten the valve stem assembly 10, the assembly also includes a fastening mechanism 46, which is typically a nut. This fastening mechanism 46 is also slid over the valve stem body first end 14 and rests against the sleeve 42. In order to tighten the valve stem assembly 10, the fastening mechanism 46 or nut is threaded over the first set of external threads 26 and tightened, thereby compressing the rubber fixture 38 against the tire rim inner surface 36, due to the engagement and pressure of the sleeve 42 against the tire rim outer surface 44. The tightening and loosening of the fastening mechanism 46 provides a clamping motion to the valve stem assembly 10.

Figure 2:
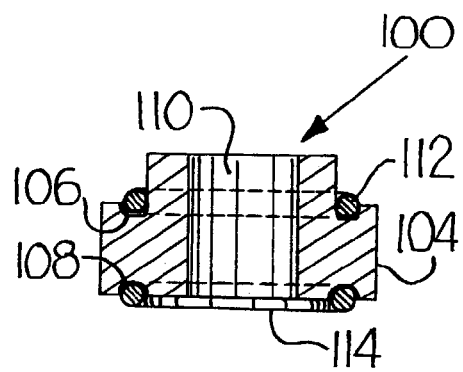
FIG. 2 is a side sectional view of a valve stem adaptor according to the present invention.

The present invention is a valve stem adaptor 100, as illustrated in FIG. 2. The valve stem adaptor 100 is used in place of the rubber fixture 38, as described above. As seen in FIG. 2, the valve stem adaptor 100 has an adaptor body 102, and the adaptor body 102 has an adaptor rim portion 104. In one preferred and non-limiting embodiment, the adaptor rim portion 104 has an adaptor rim portion upper groove 106 and an adaptor rim portion lower groove 108. Further, the adaptor body 102 has a passageway 110 extending therethrough.

In order to provide an adequate seal between the adaptor rim portion 104 and the tire rim inner surface 36, a first O-ring 112 is used. This first O-ring 112 is inserted at least partially into the adaptor rim portion upper groove 106. Similarly, in order to provide a seal between the adaptor rim portion 104 and the circular end rim 18, a second O-ring 114 is at least partially inserted into the adaptor rim portion lower groove 108.

The adaptor body 102 is manufactured from a rigid material. For example, the adaptor body 102 can be manufactured from a metal, a semi-metal, an alloy, a hardened plastic, a ceramic, or other substance that demonstrates minimal or no "wear" characteristics. In a preferred embodiment, the adaptor body 102 is manufactured from brass.

Figure 3:
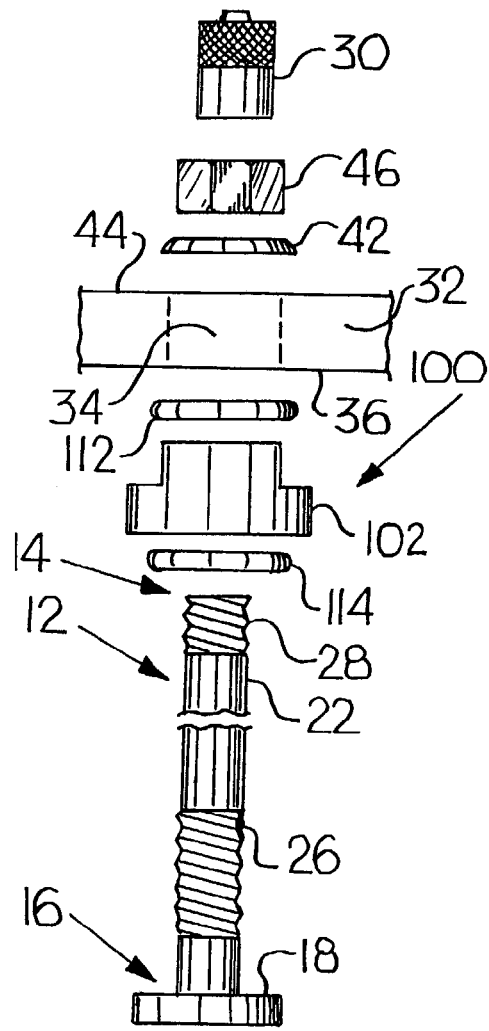
FIG. 3 is a side exploded view of a valve stem assembly, together with the valve stem adaptor, according to the present invention.

As illustrated in FIG. 3, the valve stem adaptor 100 is used in conjunction with the valve stem assembly 10, serves to provide a seal between the valve stem assembly 10 and the tire rim 32, and minimizes or eliminates the "wear" problems associated with the prior art. As seen in FIG. 3, the second O-ring 114 is inserted over the valve stem body first end 14 and inserted at least partially into the circular end rim groove 20. Next, the adaptor body 102 is inserted over the valve stem body first end 14 via the valve stem adaptor passageway 110. After the adaptor body 102 is inserted over the elongated shaft portion 22, the first O-ring 112 is inserted over the valve stem body first end 14 and, further, at least partially inserted into the adaptor rim portion upper groove 106. Also, consequently, the second O-ring 114 is now located at least partially within the adaptor rim portion lower groove 108.

After installation of the valve stem adaptor 100, the valve stem body first end 14 is inserted through the tire rim orifice 34 until the first O-ring 112 contacts the tire rim inner surface 36. Next, the sleeve 42 is inserted over the valve stem body first end 14, and the fastening mechanism 46 (or nut) is likewise inserted over the valve stem body first end 14. Since the first set of external threads 26 is located above the tire rim outer surface 44, the fastening mechanism 46 is threaded on the first set of external threads 26 until the circular end rim 18 and valve stem adaptor 100 are sealingly engaged with the tire rim inner surface 36. Finally, if so desired, an end cap 30 is threaded onto the second set of external threads 28, and the valve stem assembly 10 is complete.

Figure 4:
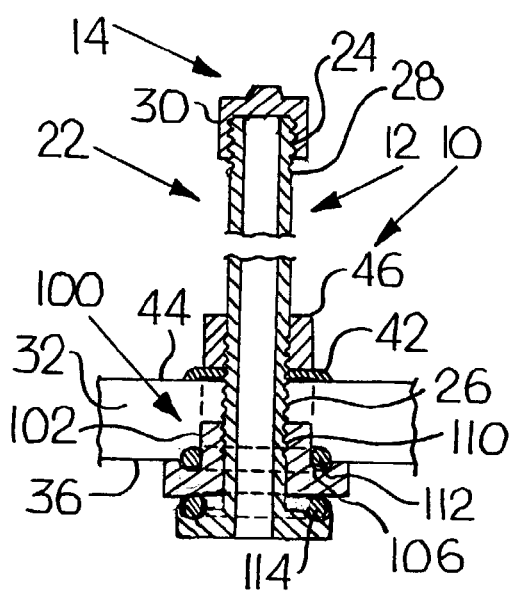
FIG. 4 is a side sectional view of the valve stem assembly and valve stem adaptor of FIG. 3.

In another preferred and non-limiting embodiment, as illustrated in FIG. 4, the adaptor rim portion 104 can be manufactured without the adaptor rim portion lower groove 108. Instead, a lower surface of the adaptor rim portion 104 can be substantially flat. In this embodiment, the second O-ring 114 is still inserted over the valve stem body first end 14, however the O-ring 114 is positioned adjacent the bottom surface of the adaptor rim portion 104. This does not substantially affect the functionality or seal, since the circular end rim 18 is urged against the second O-ring 114, which, in turn, is urged against the bottom surface of the adaptor rim portion 104. In addition, due to the circular shape and structure of the adaptor rim portion 104, the second O-ring 114 provides an adequate seal. Similarly, it is also envisioned that the adaptor rim portion 104 can be manufactured without an adaptor rim portion upper groove 106. As with the adaptor rim portion lower groove 108, the adaptor rim portion upper groove 106 merely serves to seat and position the first O-ring 112. While this may be preferable, it is not necessary, instead positioning the first O-ring 112 directly against an upper surface of the adaptor rim portion 104.

The present invention drastically minimizes the leakage of air at the valve stem assembly 10/tire rim inner surface 36 interface. Since the adaptor body 102 is manufactured from a rigid material, maintenance of the valve stem assembly 10 is decreased, yielding efficiencies in the maintenance process. Since a rigid body may have difficulty in providing an air-tight seal, the first O-ring 112 and the second O-ring 114 complete the valve stem adaptor 100 and provide such a seal. The present invention decreases the labor costs and time associated with maintaining tires and, in particular, heavy truck tires.

This invention has been described with reference to the preferred embodiments. Obvious modifications and alterations will occur to others upon reading and understanding the preceding detailed description. It is intended that the invention be construed as including all such modifications and alterations.

What is claimed is:

1. A valve stem adaptor for a valve stem assembly having a body with a body first end and a body second end, the body having an elongated shaft portion with a shaft first end and a shaft second end, the shaft portion extending through a tire rim orifice, and having a passageway extending through the shaft portion, the shaft second end having external threads displaced thereon, the body second end having a circular end rim with an end rim groove extending substantially around an end rim perimeter, and the valve stem assembly including a fastening mechanism adapted to engage an outer surface of a tire rim, the valve stem adaptor comprising:
   an adaptor body extending within the tire rim orifice, the adapter body manufactured from rigid material and having an adaptor rim portion with an upper surface, a lower surface and a passageway extending through the adaptor body;
   a first O-ring adapted to fit adjacent the upper surface of the adaptor rim portion; and
   a second O-ring adapted to fit adjacent the lower surface of the adaptor rim portion.

2. The valve stem adaptor of claim 1, wherein the adaptor body and the adaptor rim portion are substantially circular in shape.

3. The valve stem adaptor of claim 1, wherein the adaptor body is manufactured from at least one of metal, a semi-metal, an alloy, a substantially rigid polymer, plastic and a ceramic.

4. The valve stem adaptor of claim 3, wherein the adaptor body is manufactured from brass.

5. The valve stem adaptor of claim 1, wherein the adaptor body includes an adaptor rim portion with an upper groove and the first O-ring is adapted to fit at least partially within the upper groove.

6. The valve stem adaptor of claim 1, wherein the adaptor body has an adaptor rim portion with an upper groove and a lower groove; wherein the first O-ring is adapted to fit at least partially within the upper groove and the second O-ring is adapted to fit at least partially within the lower groove.

7. The valve stem adaptor of claim 6, wherein, in operation, the adaptor body is fitted over the valve stem shaft, the second O-ring at least partially enters the end rim groove, and the first O-ring seals against an inner surface of the tire rim, whereby the end rim groove is sealingly engaged with the adaptor rim portion, and the adaptor rim portion is sealingly engaged with the inner surface of the tire rim.

8. The valve stem adaptor of claim 1, wherein at least one of the first O-ring and the second O-ring is manufactured from a synthetic material.

9. The valve stem adaptor of claim 8, wherein the synthetic material is rubber.

10. A valve stem for a tire, comprising:
    a valve stem assembly, including:
    (i) a body with a body first end and a body second end, the body second end having a circular end rim with an end rim groove extending substantially around an end rim perimeter;
    (ii) an elongated shaft portion with a shaft first end and a shaft second end, the shaft extending through a tire rim orifice and having a passageway extending through the shaft, the shaft second end having external threads displaced thereon; and
    (iii) a fastening mechanism adapted to engage an outer surface of a tire rim; and
    a valve stem adaptor, including:
    (i) an adaptor body extending within the tire rim orifice, the adaptor body manufactured from a rigid material and having an adaptor rim portion with an upper surface, a lower surface and a passageway extending through the adaptor body;
    (ii) a first O-ring adapted to fit adjacent the upper surface of the adaptor rim portion; and
    (iii) a second O-ring adapted to fit adjacent the lower surface of the adaptor rim portion.

11. The valve stem of claim 10, wherein the adaptor body is fitted over the valve stem shaft, the second O-ring abuts the lower surface of the adaptor rim portion, and the first O-ring seals against an inner surface of the tire rim, whereby the end rim groove is sealingly engaged with the adaptor rim portion, the adaptor rim portion is sealingly engaged with the inner surface of the tire rim and the fastening mechanism is frictionally engaged with the outer surface of the tire rim by threading the fastening mechanism on the external threads of the shaft.

12. The valve stem of claim 10, wherein the first shaft end includes external threads displaced therein, the valve stem further including an end cap having an internally threaded bore and configured to mate with the external threads.

13. The valve stem of claim 10, wherein the fastening mechanism is a nut having an internally threaded bore and configured to mate with the external threads on the shaft second end.

14. The valve stem of claim 13, further comprising a sleeve adapted to fit over the elongated shaft portion and abut a tire rim outer surface, the nut abutting the sleeve and urging the sleeve towards the tire rim outer surface when engaged with the external threads on the shaft second end.

15. The valve stem of claim 10, wherein the adaptor body and the adaptor rim portion are substantially circular in shape.

16. The valve stem of claim 10, wherein the adaptor body is manufactured from at least one of metal, a semi-metal, an alloy, a substantially rigid polymer, plastic and a ceramic.

17. The valve stem of claim 16, wherein the adaptor body is manufactured from brass.

18. The valve stem of claim 10, wherein at least one of the first O-ring and the second O-ring is manufactured from a synthetic material.

19. The valve stem of claim 10, wherein the adaptor body includes an adaptor rim portion with an upper groove and the first O-ring is adapted to fit at least partially within the upper groove.

20. The valve stem of claim 10, wherein the adaptor body has an adaptor rim portion with an upper groove and a lower groove; wherein the first O-ring is adapted to fit at least partially within the upper groove and the second O-ring is adapted to fit at least partially within the lower groove.

* * * * *